J. W. HUDLOW & J. M. CHAPMAN.
CREAM SEPARATOR.
APPLICATION FILED NOV. 4, 1910.
1,013,164.
Patented Jan. 2, 1912.
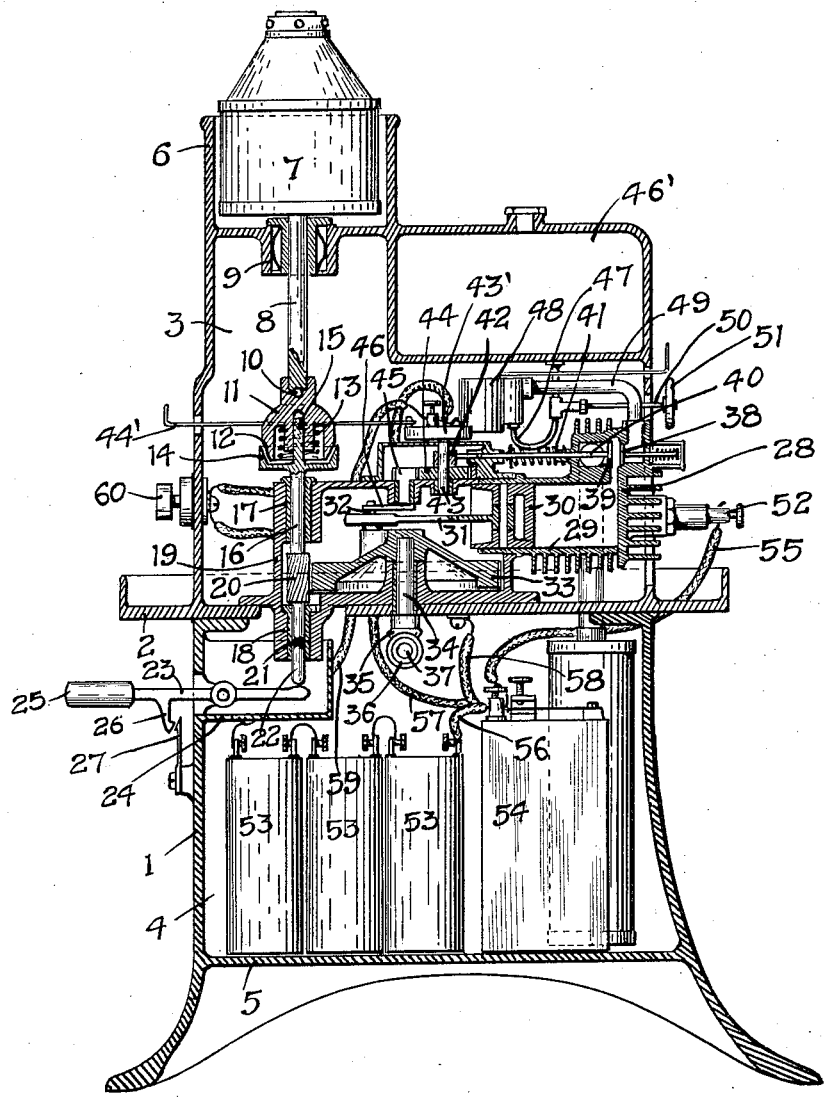
WITNESSES
INVENTORS
JOHN W. HUDLOW
JOHN M. CHAPMAN

UNITED STATES PATENT OFFICE.

JOHN W. HUDLOW, OF MINNEAPOLIS, AND JOHN M. CHAPMAN, OF GARDEN CITY, MINNESOTA.

CREAM-SEPARATOR.

1,013,164. Specification of Letters Patent. Patented Jan. 2, 1912.

Application filed November 4, 1910. Serial No. 590,735.

*To all whom it may concern:*

Be it known that we, JOHN W. HUDLOW, of Minneapolis, county of Hennepin, and State of Minnesota, and JOHN M. CHAPMAN, of Garden City, county of Blue Earth, and State of Minnesota, have invented certain Improvements in Cream-Separators, of which the following is a specification.

This invention relates to improvements in centrifugal cream separators, and the objects we have in view are to provide a compact, power-driven separator having all of the parts of the mechanism, including the power-generator, arranged as a unit within a single casing, whereby the separator bowl may be driven at the desired speed by means of an internal combustion or explosive engine contained within said casing, and provided with a clutch arranged to be operated from a point outside of the casing for connecting said engine with the driving shaft of the separator bowl.

The invention consists generally in the constructions and combinations hereinafter described and particularly pointed out in the claims.

The accompanying drawing forming part of this specification is a vertical section of a cream separator embodying our invention.

In the drawing, 1 represents a suitable casing arranged to contain all of the operating parts of the mechanism by which the centrifugal separating bowl is driven. This casing may be formed of two separate parts suitably secured together and separated by a horizontal division plate 2, forming an upper compartment 3 and a lower compartment 4, and the lower compartment being preferably provided with a horizontal bottom plate
5. Upon the top of the casing we preferably provide a circular wall 6, within which is arranged a centrifugal separating bowl 7. This bowl is provided with a vertically depending stem 8 which passes through a bearing 9 arranged in an opening in the top of the casing beneath the center of the space inclosed by the circular wall 6. The separating bowl 7 may be removed and inserted at will, the lower end of the stem 8 being provided with a notch that engages a pin 10 in the clutch hub 11. This hub is provided at its lower end or bottom portion with a conical clutch surface 12, and it preferably has arranged within it a spiral spring 13 that is adapted to engage the face of the clutch member 14 for the purpose of separating the two members of the clutch. The lower clutch member 14 is preferably provided with a central stem 15 that extends into a central opening in the clutch hub 11. The clutch member 14 is mounted upon or formed integrally with a driving shaft 16 mounted in vertical bearings 17 and 18 in the engine frame 19. Shaft 16 carries a suitable pinion 20. This shaft is capable of being raised or lowered, sliding vertically in the bearings 17 and 18, and at its lower end it rests by a ball bearing 21 upon a movable plug 22. This plug rests upon the end of a lever 23 pivoted to the casing 24, and extending outside of the casing, is provided with a handle 25 and a suitable hook 26. This hook may be engaged with a spring hook 27 on the casing, thereby locking the lever 23 with its inner end in a raised position and holding the clutch member 14 firmly in engagement with the clutch hub 11, so that as the shaft 16 is rotated the spindle 8 and bowl 7 will rotate with it.

Mounted upon the horizontal division plate 2 is an internal combustion engine 28 having a suitable frame 19, hereinbefore referred to, that rests upon and is secured to the said division plate 2. As already stated, the bearings 17 and 18 for the shaft 16 are formed upon or secured to this engine frame and the bearing 18 preferably extends downward through an opening in the division plate, into the lower compartment 4 of the casing. The engine is provided with a cylinder 29 horizontally arranged and formed as a part of said frame, or formed independently therefrom, and secured to the said engine frame 19. Within this cylinder 29 is a reciprocating piston 30 of ordinary type provided with a piston rod 31 that is connected to an eccentrically placed pin 32, on a combined gear and fly wheel 33. This combined gear and fly wheel is provided with the usual gear teeth which engage the pinion 20 upon the shaft 16. A stub shaft 34 is mounted in the division plate 2 and is provided with a suitable clutch member that engages said fly wheel (not shown) in the usual manner for the purpose of starting the engine by hand. This shaft has a beveled pinion 35 that engages a corresponding pinion 36 upon a shaft 37. Any suitable arrangement of starting device may, however, be employed.

The engine is provided with the usual inlet and exhaust valves 38 and 39, and we preferably provide a suitable valve stem 40, having a spring 41, and engaging a cam 42 upon a cam shaft 43. This shaft is provided with a gear 44, engaged by a pinion 45 that is rotated by a link 46 engaging the crank pin 32. We also prefer to provide a suitable timer 43′, having an adjusting rod 44′ extending outside of the casing. A gasolene tank or reservoir 46′ is arranged in the top of the casing and is provided with a fuel pipe 47 that extends to a carbureter 48, from which a pipe 49 extends to the gas inlet of the engine. A suitable valve is arranged in the pipe 47. This is controlled by a valve stem 50 and hand wheel 51. The engine is provided with the usual spark plug 52, and with suitable batteries 53, located in the lower compartment of the casing and with a spark coil 54. Suitable conductors 55, 56, 57, 58 and 59 connect the batteries, the spark coil, the spark plug, the timer and a suitable cut out 60. These electrical connections are arranged in any suitable manner and need not be described in detail.

In operating the device the internal combustion engine within the casing is started by means of the shaft 37, and, then, by means of the lever 23, the clutch member 14 is moved into engagement with the upper clutch member 11, and thereafter the shafts 16 and 8, and the bowl 7, are driven at a high rate of speed through the internal combustion engine arranged in the upper compartment of said casing. This engine rotates the combined fly wheel and gear 33 and through the pinion 20 drives the shaft 16, and it, through the clutch described, drives the shaft 8 and the bowl 7. These parts may be driven at any desired speed.

It will be seen that the apparatus is very compact, all of the parts being arranged within a single casing, so that the structure forms a single unit which may be set up at any desired place and by which the driving shaft of the bowl may be operated at the desired speed by mechanism contained wholly within said casing.

The details of the construction may be varied in many particulars without departing from our invention.

We claim as our invention:

1. The combination with a suitable casing, of a drive spindle mounted therein, a suitable engine arranged within said casing, a combined fly wheel and gear connected with said engine and driven thereby, a driving shaft engaged and operated by said gear, and means for coupling said shaft with said drive spindle; substantially as described.

2. The combination, with a suitable casing, of a separator bowl mounted thereon and having a stem projecting vertically into said casing, a vertically adjustable driving shaft arranged within said casing and in alinement with said bowl stem, a hand-operated mechanism for vertically moving said shaft, means for coupling said shaft and stem together, and means located within said casing for rotating said driving shaft, substantially as described.

3. The combination with a suitable casing, of a drive spindle mounted therein, a vertically adjustable driving shaft arranged within said casing and in alinement with said spindle, means for vertically adjusting said driving shaft, means for coupling said shaft and spindle together, a pinion upon said driving shaft, a combined fly wheel and gear arranged within said casing and engaging the pinion upon said driving shaft, and a motor arranged within said casing and operatively connected with said gear; substantially as described.

4. The combination with a suitable casing, of a drive spindle mounted therein, a vertically adjustable driving shaft arranged within said casing and in alinement with said spindle, means for vertically adjusting said driving shaft, means for coupling said shaft and spindle together, a pinion upon said driving shaft, a combined fly wheel and gear arranged within said casing and engaging the pinion upon said driving shaft, and an internal combustion engine arranged within said casing and operatively connected with said gear; substantially as described.

5. The combination with a suitable casing, provided with a horizontal plate dividing the interior of said casing into an upper and lower compartment, of a drive spindle mounted in said casing and projecting vertically into the upper compartment of said casing, a vertically adjustable driving shaft arranged within said casing and in alinement with said spindle, and means for coupling said shaft and spindle together, a combined fly wheel and driving gear in engagement with said driving shaft, and an internal combustion engine supported upon said plate within the upper compartment of said casing, and arranged to rotate said combined fly wheel and gear; substantially as described.

6. The combination with a suitable casing provided with a horizontal plate dividing the interior of said casing into an upper and lower compartment, of a drive spindle mounted in said casing and projecting vertically into the upper compartment, a vertically adjustable driving shaft mounted in the horizontal plate and in alinement with said spindle, means for coupling said shaft and spindle together, means for moving the driving shaft vertically, a gear carried by the driving shaft, a horizontally arranged combined fly wheel and driving gear mounted on the horizontal plate and in mesh with the gear carried by the driving shaft, a horizontally arranged internal combustion engine supported on the plate within the upper compartment and the piston rod of said engine connected to a wrist pin carried by said horizontally arranged combined fly wheel and gear, whereby the spindle is rapidly rotated.

In witness whereof, we have hereunto set our hands this 13th day of October, 1910.

JOHN W. HUDLOW.
JOHN M. CHAPMAN.

Witnesses:
GENEVIEVE E. SORENSEN,
C. H. REHFUSS.

Copies of this patent may be obtained for five cents each, by addressing the "Commissioner of Patents, Washington, D. C."